Jan. 10, 1956     J. DODD     2,730,220
DEVICE FOR THE ATTACHMENT OF TOOLS TO DRILLING AND
OTHER POWER OPERATED METAL WORKING MACHINES
Filed Nov. 3, 1952     2 Sheets-Sheet 1
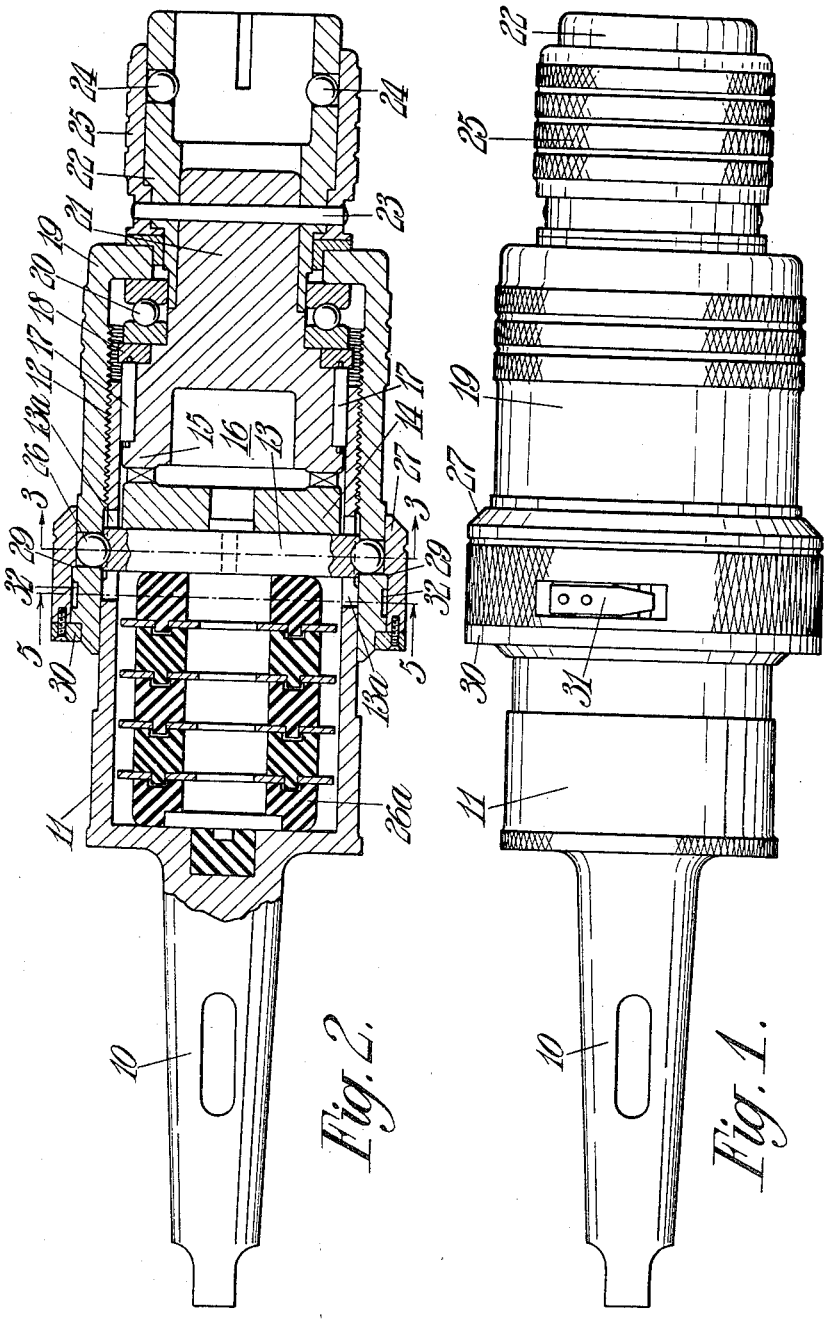
Inventor
J. Dodd Jan. 10, 1956  J. DODD  2,730,220
DEVICE FOR THE ATTACHMENT OF TOOLS TO DRILLING AND
OTHER POWER OPERATED METAL WORKING MACHINES
Filed Nov. 3, 1952  2 Sheets-Sheet 2

Inventor
J. Dodd

United States Patent Office 2,730,220
Patented Jan. 10, 1956

2,730,220

DEVICE FOR THE ATTACHMENT OF TOOLS TO DRILLING AND OTHER POWER OPERATED METAL WORKING MACHINES

John Dodd, Greenock, Scotland

Application November 3, 1952, Serial No. 318,392

Claims priority, application Great Britain November 9, 1951

2 Claims. (Cl. 192—114)

This invention has reference to devices for the attachment of tools for drilling, reaming, boring, countersinking, tapping, studding and like operations to drilling and other power operated metal working machines.

It is known to provide a device for the attachment of tapping and studding tools to a drilling or other power operated metal working machines, such device incorporating a slipping clutch which slips when the tool encounters abnormal resistance, so that the tool is not then rotated.

In drilling, reaming, boring and countersinking operations a positive feed movement is imparted to the tool so that devices with slipping clutches as heretofore constructed are totally unsuitable. It is essential that the tool be rotated concomitantly with the feed. If any slip occurred damage to the tool, to said device, to the machine or to the work being operated on would inevitably occur by the power feed continuing in action.

The present invention has for its object to provide a device for attachment of tools to drilling and other power operated metal working machines and which device can be adjusted to suit the operation to be performed.

Figure 3:
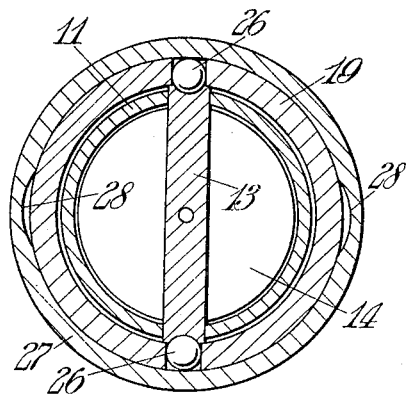
Figure 4:
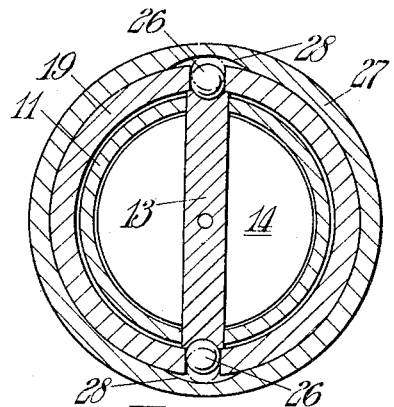
Figure 5:
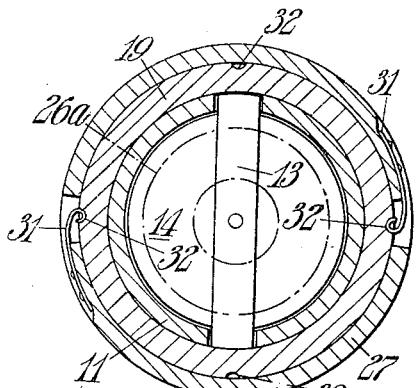

A preferred embodiment of the invention will now be described with reference to the annexed drawings wherein:

Figure 1 is an elevation of the device.
Figure 2 is a sectional elevation thereof.
Figure 3 is a section on the line 3—3 of Figure 2.
Figure 4 is a view corresponding to Figure 3 but showing the outer sleeve rotated 90° and
Figure 5 is a section on the line 5—5 of Figure 2.

According to the embodiment of the invention illustrated in the drawings the improved device comprises a tapered or parallel shank 10 for attachment to a drilling or like machine and which shank has formed integral therewith or has secured thereto a cylindrical casing 11 externally threaded as at 12 for a portion of its length.

Said casing is provided with diametrically opposite axially extending slots 13a with which engages a driving key 13. This key passes through a transverse slot in the driving member 14 of a clutch having clutch teeth on one face thereof.

Co-operating with the driving member of the clutch is the driven member 15 having clutch teeth which co-operate with the teeth of the driving member.

The driven member is internally bored to form a grease well 16 and carries anti-friction roller bearings 17 which bear on the inner face of the casing 11. Said roller bearings are retained in position by means of a retaining ring 18.

Screwed on the cylindrical casing is a flanged sleeve 19, a ball thrust bearing 20 being interposed between the retaining ring 18 and the flange of the sleeve.

Said bearing encloses an axial extension 21 of the driven member and towards its outer end the extension has fitted thereon a sleeve or adaptor holder 22 which carries an adaptor, not shown, keyed therein. The holder is secured to the extension of the driven member by means of a driving pin 23.

The adaptor is designed to receive a tool appropriate to the work to be done.

The adaptor is removably secured in the holder 22 by any suitable means such as a pair of steel balls 24 located in holes in the wall of the holder and, when moved radially inwards, engaging an annular channel in the adaptor. Said balls are forced inwards by means of a knurled sleeve 25 snugly enclosing the holder. This sleeve is also provided with an extension of reduced diameter which is provided with circumferential slots. The pin 23 extends through the slots. By rotating the sleeve 25 relative to the holder the balls can be forced into the annular channel so that the balls then prevent the withdrawal of the adaptor from the holder. Also by rotating the sleeve so that the recesses register with the balls the latter can move clear of the annular recesses to permit withdrawal of the adaptor.

Interposed between the closed end of the casing 11 and the driving clutch member 14 is a resilient cushion 26a which may be as set forth in my U. S. A. patent specification No. 2,540,513.

Each of the outer ends of the aforesaid key 13 is provided with a concave recess. Two diametrically opposite apertures are formed in the casing 11 and in each aperture is fitted a steel ball 26. Rotatable on the casing is an outer sleeve 27 with knurled external face and provided on its inner face with two diametrically opposite circumferentially extending recesses 28 having cam like faces. The outer sleeve abuts against a shoulder 29 formed integral with the casing and is held against accidental axial displacement by means of a retaining ring 30. The outer sleeve is recessed to receive two diametrically opposite locating blade springs 31 riveted to the sleeve. The free ends of the springs are rounded and are arranged to engage with recesses 32 in the sleeve 19, the recesses being so positioned that the springs retain the outer sleeve against accidental circumferential displacement in either of its two positions.

When drilling, reaming, spot facing, boring or like operations a suitable tool is fitted to the device and the sleeve 19 together with the outer sleeve 27 are adjusted to bring the balls 26 into alignment with the ends of the key 13, the casing 11 and sleeve 19 having co-operating markings to indicate when said adjustment is made. Thereafter the outer sleeve 27 is moved to the position shown in Figures 2 and 3 so that the balls 26 are positively held against the concave ends of the key 13. In consequence the key and therefore the driving member 14 of the clutch cannot partake of an axial movement relative to the driven member 15. The clutch members are therefore locked in engagement with each other and the tool will be rotated concomitantly with its feed.

To use the device in tapping and studding operations where no positive feed is imparted to the tool an appropriate tool is fitted to the device and the outer sleeve 27 rotated 90° so that the two recesses 28 are brought into register with the balls as shown in Figure 4.

If the cushion is not at the compression necessary to hold the clutch members together at the requisite pressure this is rectified by screwing the sleeve 19 into or out of the casing 11, the outer sleeve 27 rotating therewith. Suitable indications are provided on the casing to indicate the position of the sleeve for various tapping and studding operations.

When the tool encounters abnormal resistance the clutch can slip. That is the driving member can rise off the driven member against the action of the resilient cushion 26a, the balls 26 being forced into the recesses to permit of this as shown in chain dotted lines in Figure 4.

When the outer sleeve is in either of its two positions the rounded ends of the two locating blade springs 31 engage in the recesses 32 in the outer wall of the sleeve 19, such engagement preventing the accidental movement of the outer sleeve.

By a further rotary movement of the outer sleeve the cam faces of the recesses force the balls into engagement with the ends of the key.

To visually indicate the position of the outer sleeve with respect to the balls the said outer sleeve and sleeve 19 may be provided with suitable co-operating indications. For example the sleeve 19 may bear the words "Tapping" and "Drilling," the marking being 90° apart, and the outer sleeve provided with a mark such as a coloured disc, to register with said words. When said mark registers with "Drilling" the outer sleeve is as shown in Figure 3 and when it registers with "Tapping" it is as shown in Figure 4.

What I claim is:

1. A device for the attachment of tools for drilling, reaming, boring, countersinking, tapping, studding and like operations to drilling and other power-operated metal working machines provided with a slipping clutch through which the drive is transmitted, said clutch comprising driving and driven members having co-acting faces each having interengaging teeth with sloping faces, a casing in which is located the driving and driven clutch members together with resilient means urging said members into co-operative engagement, an internally screw threaded sleeve screwed on the casing, said sleeve having at one end thereof an internal flange, anti-friction bearings provided between the said flange and the driven clutch member, the loading on the clutch members being adjusted by adjusting the sleeve on its casing, a driving key connecting the driving clutch member to the casing, an outer sleeve enclosing said internally threaded sleeve and having circumferenital cam recesses and balls fitted in apertures in the screw threaded sleeve and arranged to engage with recesses in the ends of the driving key, the construction being such that when the outer sleeve is in one position its recesses register with the balls so that the balls can move radially to permit the clutch members to slip and when in another position the balls are prevented from radial movement and engage the driving key so that the clutch members are positively held in engagement.

2. A device as claimed in claim 1 wherein the internally threaded sleeve and outer sleeve have co-operating locating means to retain against accidental movement the outer sleeve in either of the positions in which it is adjusted.

References Cited in the file of this patent

UNITED STATES PATENTS 2,540,513    Dodd  ------------------- Feb. 6, 1951

FOREIGN PATENTS 642,511    Great Britain ------------ Sept. 6, 1950
818,790    Germany --------------- Oct. 29, 1951